United States Patent [19]

Ohsawa

[11] 4,054,839

[45] Oct. 18, 1977

[54] BALANCED SYNCHRONOUS DETECTOR CIRCUIT

[75] Inventor: Mitsuo Ohsawa, Fujisawa, Japan

[73] Assignee: Sony Corporation, Tokyo, Japan

[21] Appl. No.: 741,125

[22] Filed: Nov. 11, 1976

[30] Foreign Application Priority Data

Nov. 18, 1975 Japan .............................. 50-138415

[51] Int. Cl.$^2$ .......................... H03D 3/18; H04H 5/00
[52] U.S. Cl. ................................ 329/50; 179/15 BT; 329/112; 329/122
[58] Field of Search .................. 329/50, 112, 122–124, 329/125; 179/15 BT, 15 BP

[56] References Cited

U.S. PATENT DOCUMENTS

| 3,798,376 | 3/1974 | Limberg | 329/50 X |
| 3,842,211 | 10/1974 | Metro | 331/176 X |
| 3,934,092 | 1/1976 | Csicsatka | 179/15 BT |

*Primary Examiner*—Siegfried H. Grimm
*Attorney, Agent, or Firm*—Lewis H. Eslinger; Alvin Sinderbrand

[57] ABSTRACT

A balanced synchronous detector circuit for detecting the amplitude of a received signal and for detecting the phase difference between the received signal and a generated signal. A preferred application of this balanced synchronous detector circuit is in a stereo decoder of the type used for receiving and decoding a composite stereo signal. The balanced synchronous detector circuit includes a first double-balanced modulator having a first section provided with a first set of input terminals to which the received signal is applied and a second section provided with a second set of input terminals to which the locally generated signal is applied. The balanced synchronous detector circuit further includes a second double-balanced modulator having a first section formed of a portion of the second section of the first double-balanced modulator and a second section provided with a set of input terminals to which another locally generated signal is applied. An output signal derived from the second section of the second double-balanced modulator is proportional to the amplitude of the received signal, and an output signal derived from the second section of the first double-balanced modulator is proportional to the phase difference between the received signal and the locally generated signal.

10 Claims, 12 Drawing Figures

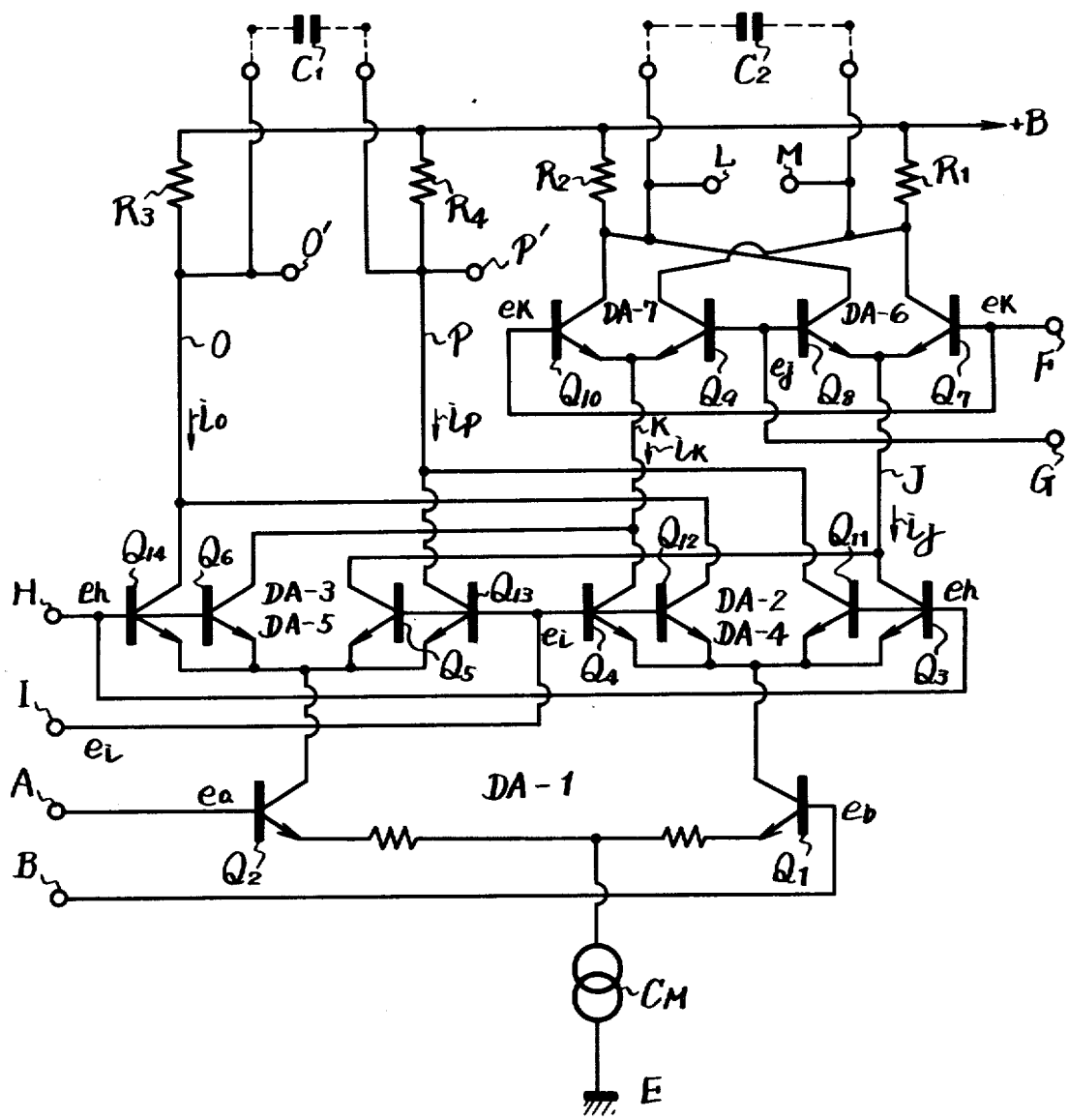

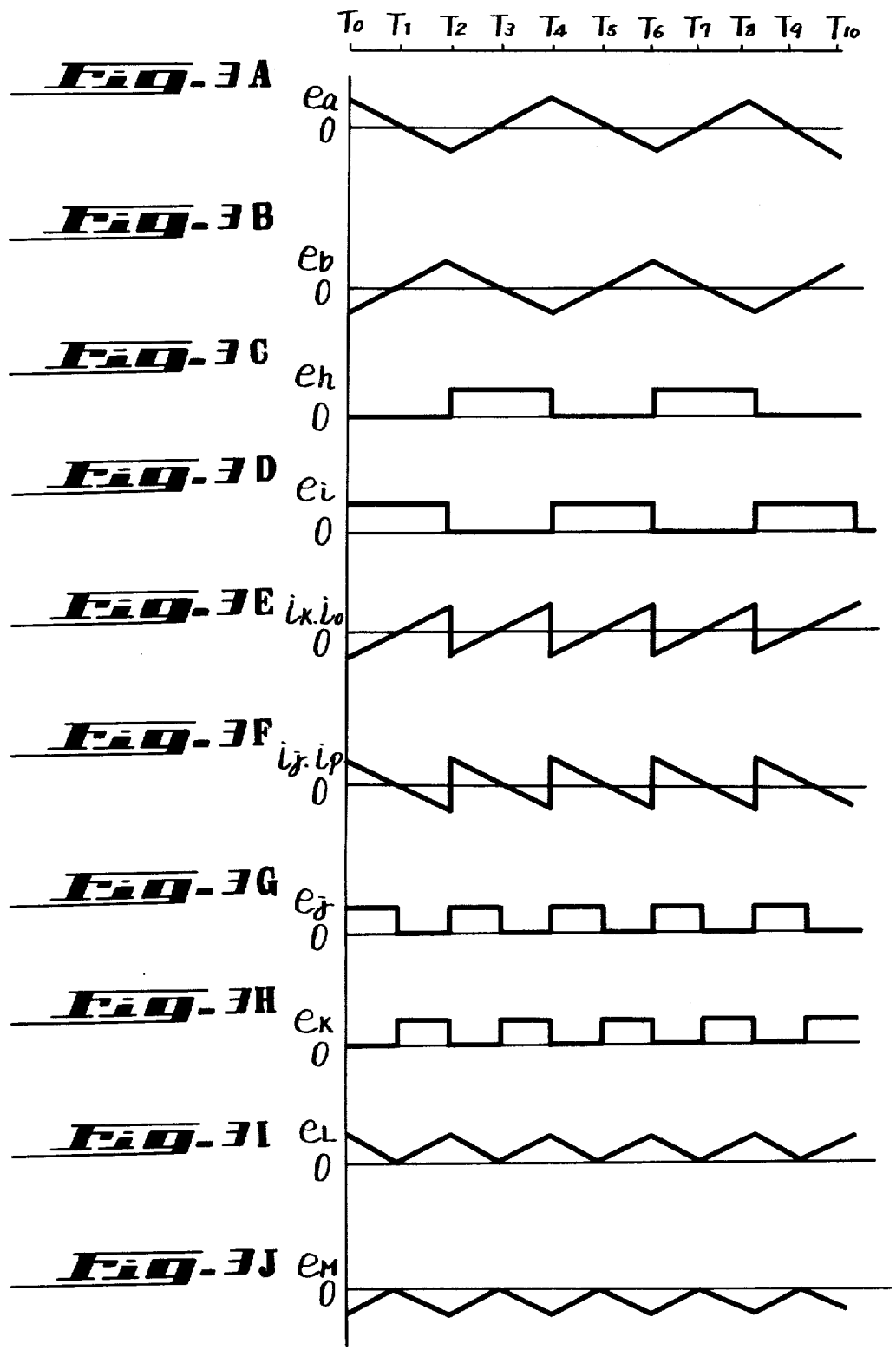

BALANCED SYNCHRONOUS DETECTOR CIRCUIT

BACKGROUND OF THE INVENTION

This invention relates to apparatus that can be used with a stereo decoder and, more particularly, to a balanced synchronous detector circuit which is adapted to receive a pilot signal and to detect the amplitude thereof and also to control a local oscillator to generate a local oscillating signal that is phase-locked with the pilot signal.

A typical type of stereo decoder is described in U.S. Pat. No. 3,842,211. In that decoder, a composite stereo signal composed of a main-channel (L+R) signal, a sub-channel (L−R) signal modulated onto a sub-carrier of 38 kHz and a pilot signal of 19 kHz is received and decoded into separate left and right channel signals L and R. The decoding of the composite stereo signal is dependent upon demodulating the sub-channel signal, and this generally requires the generation of a local sub-carrier of 38 kHz. Typically, the local sub-carrier is produced by a phase-locked circuit wherein the phase and frequency of a local oscillator are controlled by phase detection of the pilot signal included in the composite stereo signal. That is, the frequency of the local oscillator is divided to a frequency equal to that of the pilot signal and the phase of the divided local oscillator signal is compared to that of the received pilot signal. Any phase differential therebetween is used to adjust the local oscillator. Also, in this type of stereo decoder, the presence or absence of a stereo broadcast is determined by detecting the amplitude of the received pilot signal. That is, if the pilot signal amplitude exceeds a predetermined threshold, it is assumed that a stereo signal has been received.

In prior art stereo decoders, the pilot signal amplitude detector and the phase detector usually are constructed of individual circuits, each such circuit being provided with an amplifier to amplify the pilot signal accordingly. Also, although a 38 kHz sub-carrier is needed to decode the received sub-channel signal and a 19 kHz local signal is needed for phase comparison with the received pilot signal, the phase detector heretofore has required a local oscillator, or reference, signal whose phase differs from the phase of the received pilot signal by 90°. However, the pilot signal amplitude detector normally must be supplied with a locally generated reference signal that is in phase with the received pilot signal. Hence, if both of the locally generated reference signals are derived from a common local oscillator whose oscillating frequency is greater than either reference signal, the frequency dividers which must be used to produce the locally generated reference signals are required to impart a relative phase shift of 90° therebetween. Hence, prior art proposals for phase detecting circuitry and for amplitude detecting circuitry generally have resulted in complex circuit construction. Also, amplitude detectors which have been used heretofore are susceptible to erroneous operation in the event that a noise component is received having a frequency that may be similar to the pilot signal frequency. That is, such noise signal may be erroneously interpreted as a pilot signal.

OBJECTS OF THE INVENTION

Therefore, it is an object of the present invention to provide a balanced synchronous detector circuit that can be used with a stereo decoder for locking the phase of the local oscillator in that decoder and for detecting the amplitude of a received pilot signal.

Another object of this invention is to provide a balanced synchronous detector circuit that can be used with a stereo decoder and which avoids the aforenoted disadvantages of prior art proposals.

A further object of this invention is to provide a balanced synchronous detector circuit that can be used as an amplitude detector and as a phase detector, both detectors being combinable in a monolithic integrated circuit.

An additional object of this invention is to provide a balanced synchronous detector circuit that is adapted to detect the amplitude of a received signal and also to detect the phase difference between that received signal and another signal, such as a locally generated signal.

Various other objects, advantages and features of the present invention will become readily apparent from the ensuing detailed description, and the novel features will be particularly pointed out in the appended claims.

SUMMARY OF THE INVENTION

In accordance with the present invention, a balanced synchronous detector circuit is provided to detect the amplitude of a received signal and to dectect the phase difference between the received signal and a generated signal, this circuit being formed of a first double-balanced modulator having a first section provided with a first set of input terminals to which the received signal is applied and a second section provided with a second set of input terminals to which the generated signal is applied, the section being provided with a set of output terminals from which a signal is derived that is proportional to the amplitude of the received signal; and a second double-balanced modulator having a first section formed of a portion of the second section of the first double-balanced modulator and a second section provided with a set of input terminals to which a signal, whose frequency is an integral multiple of the frequency of the generated signal, is applied, the second section of the second double-balanced modulator being provided with a set of output terminals from which a signal proportional to the phase difference between the received and generated signals is derived.

In a preferred application, the balanced synchronous detector circuit is used with a stereo decoder such that the received signal is the pilot signal normally included in a composite stereo signal, and the generated signal is a local oscillator signal. The frequency and phase of the local oscillator are controlled by the output signal proportional to the phase difference between the pilot signal and the local oscillator signal, as detected by the first double-balanced modulator; and the amplitude of the pilot signal, as detected by the second double-balanced modulator, is indicative of the presence of a stereo signal.

BRIEF DESCRIPTION OF THE DRAWINGS

The following detailed description, given by way of example, will best be understood in conjunction with the accompanying drawings in which:

FIG. 2 is a schematic diagram of one embodiment of the balanced synchronous detector circuit; and FIGS. 3A to 3J are waveform diagrams that are useful in understanding the operation of the balanced synchronous detector circuit illustrated in FIG. 2.

DETAILED DESCRIPTION OF A PREFERRED EMBODIMENT

Figure 1:
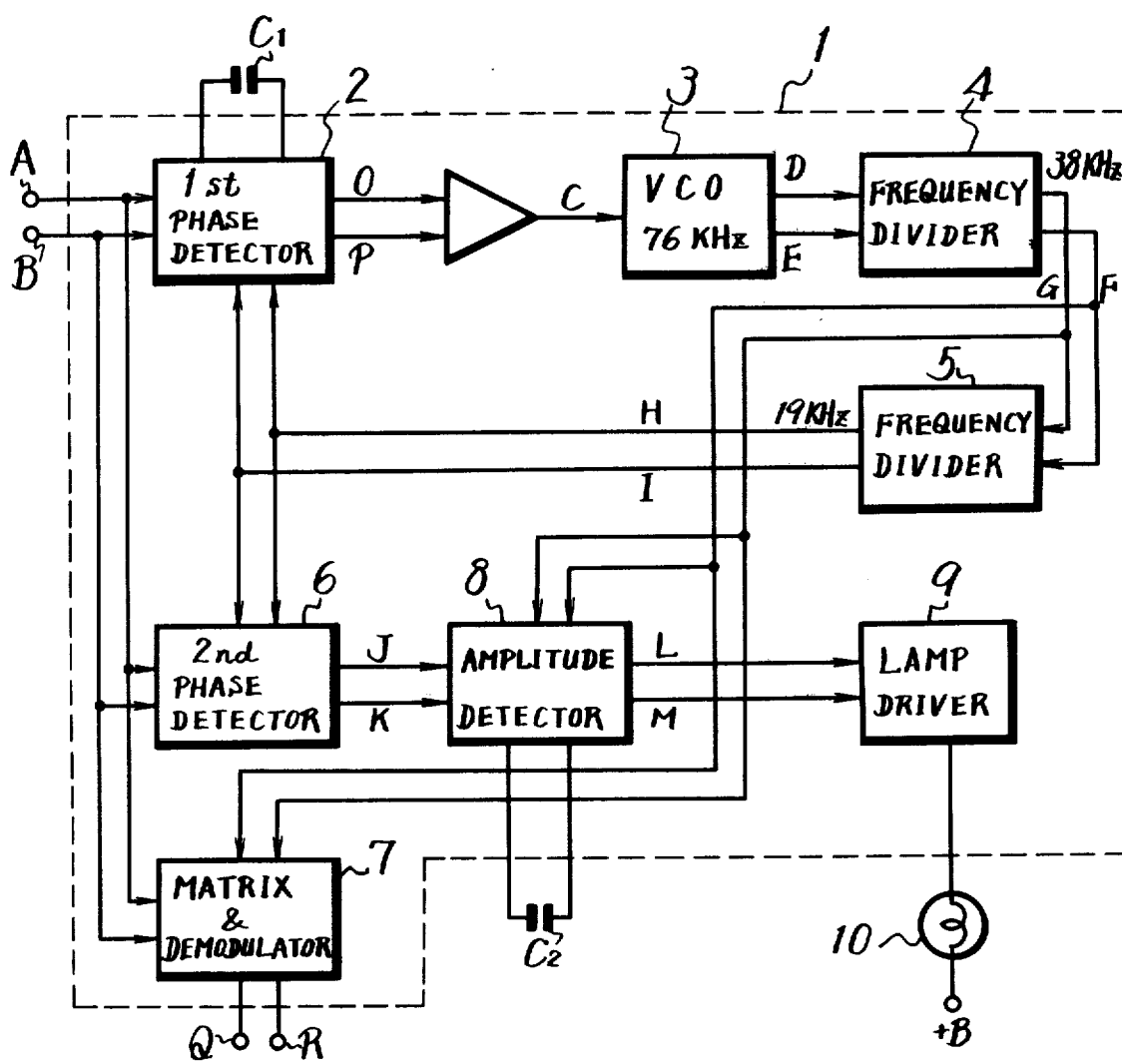
FIG. 1 is a block diagram of a stereo decoder circuit with which the balanced synchronous detector circuit of this invention can be used.

Referring first to FIG. 1, a stereo decoder circuit that can be constructed as a monolithic integrated circuit is depicted within the broken line 1 as comprising a first phase detector 2 to which a composite stereo signal is applied via input terminals A and B; these input terminals being external of the integrated circuit. Phase detector 2 is adapted to detect the phase difference between the pilot signal normally included in the composite stereo signal applied to input terminals A and B and a locally generated signal produced by a voltage-controlled oscillator 3. Any phase deviation therebetween is represented as an output signal at leads O and P from phase detector 2, this output signal being amplified and supplied as a control signal C to voltage-controlled oscillator 3.

Typically, the local oscillating signal produced by oscillator 3 has a frequency equal to 76 kHz. This signal, appearing at leads D and E, is supplied to a first frequency divider 4 which divides the frequency of the local oscillating signal by two to produce a 38 kHz reference signal at leads G and F, this reference signal being supplied to a second frequency divider 5 for the purpose of further dividing its frequency by two so as to produce a 19 kHz reference signal at leads H and I. The frequency of the reference signal produced by frequency divider 5 is equal to the frequency of the pilot signal included in the composite stereo signal so that any deviation in phase therebetween can be readily detected by phase detector 2. As is appreciated, a detected phase deviation results in a control signal applied to voltage-controlled oscillator 3 for the purpose of correcting or cancelling this phase deviation.

The composite stereo signal applied to input terminals A and B also is applied to a second phase detector 6. As will be described with respect to FIG. 2, phase detector 6 is of similar construction to phase detector 2 and also is supplied with the 19 kHz reference signal produced by frequency divider 5. Hence, a signal is produced at leads J and K by phase detector 6 to represent any phase deviation between the received pilot signal and the local reference signal. The signal at leads J and K is substantially similar to the signal at leads O and P produced by phase detector 2. The output signal from the second phase detector is applied to an amplitude detector 8 which, additionally, receives the 38 kHz local reference signal produced by frequency divider 4. The amplitude detector produces an output signal at leads L and M which is proportional to the amplitude of the received pilot signal, this output signal being applied to a lamp driver 9. The lamp driver is coupled to an indicator lamp 10, as shown, so that if the amplitude of the received pilot signal exceeds a predetermined threshold, lamp driver 9 is driven to, in turn, energize lamp 10.

Capacitors $C_1$ and $C_2$ are coupled to phase detector 2 and amplitude detector 8, respectively, in a manner shown in greater detail in FIG. 2, for the purpose of integrating the phase detector output signal produced by phase detector 2 and the detected pilot signal amplitude produced by amplitude detector 8, respectively.

A matrix and demodulator circuit 7 is supplied with the composite stereo signal applied to input terminals A and B, and also with the 38 kHz local reference signal produced by frequency divider 4. Matrix and demodulator circuit 7 is conventional and is adapted to decode the received composite stereo signal into separate channel-information signals at output terminals Q and R, respectively. Typically, such separate-channel information signals constitute the left channel and right channel signals L and R, respectively. These signals may be supplied to suitable loads, not shown, such as loudspeakers or the like.

In accordance with one aspect of the present invention, the functions of phase detectors 2 and 6 are carried out by a simplified circuit, this circuit being used in conjunction with an additional circuit to perform the amplitude detecting function of amplitude detector 8. More particularly, the phase and amplitude detecting functions are carried out by a balanced synchronous detector circuit whose construction is relatively simple and that exhibits good DC balance characteristics. The balanced synchronous detector circuit is schematically illustrated in FIG. 2. Referring now to this figure, the balanced synchronous detector circuit is formed of a first double-balanced modulator which functions as a phase detector and a second double-balanced modulator which functions as an amplitude detector. These double-balanced modulators are shown as being formed of transistor devices, such as bipolar transistors; but it will be apparent that the double-balanced modulators alternatively may be formed of other equivalent semiconductor devices, such as FET's, or the like. Furthermore, each such transistor device may be formed of a single transistor element, Darlington-connected transistors, or other cascaded amplifiers forming the respective sections and stages of the double-balanced modulators to be described. Hence, for the purpose of this description, the expression "transistor" is intended also to refer to such other transistor devices, and the respective electrodes of the described transistors also are intended to refer to the corresponding electrodes in such other transistor devices.

The first double-balanced modulator includes a first section comprised of a differential amplifier DA-1, and a second section comprised of balanced differential amplifiers DA-2 and DA-3, respectively. The second section of this first double-balanced modulator further includes balanced differential amplifiers DA-4 and DA-5. The second double-balanced modulator also includes a first section which is comprised of a portion of the second section of the first double-balanced modulator. More particularly, the first section of the second double-balanced modulator is comprised of the balanced differential amplifiers DA-2 and DA-3. A second section of the second double-balanced modulator is comprised of balanced differential amplifiers DA-6 and DA-7.

Each of the differential amplifiers forming the double-balanced modulators is formed of a pair of differentially-connected stages, each such stage being constituted by a transistor or equivalent device as mentioned above. Accordingly, differential amplifier DA-1 is formed of differentially-connected transistors $Q_1$ and $Q_2$ whose emitter electrodes are connected to a common junction which is supplied with a constant current by a constant current source $C_M$ coupled to a reference point E, such as ground. The base electrodes of transistors $Q_1$ and $Q_2$ are connected to input terminals B and A, respectively (FIG. 1) to receive, for example, the 19 kHz pilot signal normally included in the composite stereo signal. This signal is applied in oppositely phased relation to transistors $Q_1$ and $Q_2$, as will be shown below. Although not shown, it may be recognized that the pilot signal can be supplied to these transistors by suitable filter circuits.

The collector electrode of transistor $Q_1$ is connected in series with differential amplifier DA-2 such that when current flows through this differential amplifier and transistor $Q_1$ is conducting, the same current will flow through this conducting transistor. Similarly, the collector electrode of transistor $Q_2$ is connected in series with differential amplifier DA-3. Differential amplifier DA-2 is formed of differentially connected transistors $Q_3$ and $Q_4$ whose emitter electrode are connected to transistor $Q_1$. The base electrodes of transistors $Q_3$ and $Q_4$ are connected to input terminals H and I, respectively (see FIG. 1) to receive a locally generated, or reference, signal that is applied to these transistors in oppositely-phased relation. As is apparent from FIG. 1, the frequency of the reference signal applied to input terminals H and I is equal to the frequency of the pilot signal applied to input terminals A and B, and is produced by the phase-locked loop formed of voltage-controlled oscillator 3 and frequency dividers 4 and 5. Differential amplifier DA-3 is similarly constructed and is formed of differentially-connected transistors $Q_5$ and $Q_6$ whose emitter electrodes are connected in common to transistor $Q_2$. The base electrodes of transistors $Q_5$ and $Q_6$ are connected to the input terminals I and H, respectively, to receive the locally generated reference signal which is applied thereto in oppositely-phased relation.

The collector electrodes of transistors $Q_3$ and $Q_5$ are connected in common to a lead J; and the collector electrodes of transistors $Q_4$ and $Q_6$ are connected in common to another lead K, these leads being shown also in FIG. 1. Lead J is connected to differential amplifier DA-6 so as to connect transistors $Q_{33}$ and $Q_5$ in series with this differential amplifier. Similarly, leak K is connected to differential amplifier DA-7 so as to connect transistors $Q_4$ and $Q_6$ in series with this differential amplifier. Differential amplifier DA-6 is formed of differentially-connected transistors $Q_7$ and $Q_8$ whose emitter electrodes are connected in common to lead J and whose base electrodes are connected to input terminals F and G, respectively, for receiving another locally generated reference signal, such as the 38 kHz reference signal produced by frequency divider 4, shown in FIG. 1. In similar fashion, differential amplifier DA-7 is formed of differentially-connected transistors $Q_9$ and $Q_{10}$ whose emitter electrodes are connected in common to lead K and whose base electrodes are connected to input terminals G and F, respectively. The collector electrodes of transistors $Q_7$ and $Q_9$ are connected in common and through a load resistor $R_1$ to a source of operating voltage +B, as supplied by a suitable DC supply. The collector electrodes of transistors $Q_8$ and $Q_{10}$ are connected through another load resistor $R_2$ to the source of operating voltage +B. Differential amplifiers DA-6 and DA-7 are provided with a set of output terminals L and M, with output terminal L being coupled to the common-connected collector electrodes of transistors $Q_8$ and $Q_{10}$, and output terminal M being coupled to the common-connected collector electrodes of transistors $Q_7$ and $Q_9$.

A capacitor $C_2$ is connected across output terminals L and M for the purpose of integrating the output signal produced thereacross.

Returning to differential amplifiers DA-4 and DA-5, it is seen that these diffferential amplifiers are connected in parallel with differential amplifiers DA-2 and DA-3, respectively. Thus, differential amplifier DA-4 is formed of differentially-connected transistors $Q_{11}$ and $Q_{12}$ whose base-emitter circuits are connected in parallel with the base-emitter circuits of transistors $Q_3$ and $Q_4$, respectively. Similarly, differential amplifier DA-5 is formed of differentially-connected transistors $Q_{13}$ and $Q_{14}$ whose base-emitter circuits are connected in parallel with the base-emitter circuits of transistors $Q_5$ and $Q_6$. Thus, in this configuration, transistors $Q_{11}$ and $Q_{12}$ are adapted to receive the locally generated reference signal applied to input terminals H and I in opposite phase relation. Similarly, transistors $Q_{13}$ and $Q_{14}$ are adapted to receive these locally generated reference signals which are applied to input terminals I and H, respectively, in opposite phase relation.

The collector electrodes of transistors $Q_{11}$ and $Q_{13}$ are connected in common to a lead P; and the collector electrodes of transistors $Q_{12}$ and $Q_{14}$ are connected in common to a lead O. Lead P connects the common-connected collector electrodes of transistors $Q_{11}$ and $Q_{13}$ through a load resistor $R_4$ to the source of operating voltage +B; and lead O connects the common-connected collector electrodes of transistors $Q_{12}$ and $Q_{14}$ through a load resistor $R_3$ to the source of operating voltage +B. A set of output terminals O' and P' are connected to the common-connected collector electrodes of transistors $Q_{14}$ and $Q_{12}$, and to the common-connected collector electrodes of transistors $Q_{13}$ and $Q_{11}$, respectively. A capacitor $C_1$ is connected across output terminals O' and P' for integrating the signal produced by the first double-balanced modulator.

The operation of the illustrated balanced synchronous detector circuit now will be described in conjunction with the waveform diagrams depicted in FIGS. 3A through 3J. Let it be assumed that the signals applied to input terminals A and B are oppositely-phased 19 kHz pilot signals $e_a$ and $e_b$, respectively, as shown in FIGS. 3A and 3B. For the purpose of the present discussion, the waveforms of signals $e_a$ and $e_b$ are triangular; however, these signals need not be limited solely to such triangular-shaped waveforms. Let it be further assumed that the locally generated 19 kHz reference signal produced by frequency divider 5 is applied to input terminals H and I as oppositely-phased rectangular waveforms $e_h$ and $e_i$, respectively, as shown in FIGS. 3C and 3D. In this assumed example, the respective waveforms $e_a$, $e_b$, $e_h$ and $e_i$ depict the locally generated reference signal as being in phase with the received pilot signal.

Now, when reference signal $e_i$ is relatively positive, as between times $T_o$ and $T_2$, transistors $Q_4$ and $Q_{12}$ as well as transistors $Q_5$ and $Q_{13}$ are turned ON. Current will flow through each of transistors $Q_4$ and $Q_{12}$ in accordance with the conduction of transistor $Q_1$, and currents will flow through transistors $Q_5$ and $Q_{13}$ in accordance with the conduction of transistor $Q_2$. The conductivity of transistor $Q_1$ is determined by signal $e_b$ such that, from the period $T_o$ to $T_2$, the current $i_k$ through transistor $Q_4$ exhibits a waveform similar to that of signal $e_b$, as indicated in FIG. 3E. A similar current $i_o$ flows through lead O and through transistor $Q_{12}$ and then through transistor $Q_1$. At this time ($T_o$-$T_2$), each of transistors $Q_3$, $Q_5$, $Q_{11}$ and $Q_{13}$ is turned OFF by signal $e_h$.

It is appreciated that, when transistors $Q_4$ and $Q_{12}$ are turned ON by signal $e_i$, transistors $Q_5$ and $Q_{13}$ also are turned ON. The currents which flow through these latter transistors are determined by the conduction of transistor $Q_2$, in accordance with pilot signal $e_a$ applied thereto. More particularly, a current $i_j$ flows through lead J, through transistor $Q_5$ and through transistor $Q_2$, as illustrated in FIG. 3F. That is, from time $T_o$ to $T_2$, current $i_j$ exhibits a waveform similar to that of signal $e_a$. A similar current $i_p$ flows from lead P through transistor $Q_{13}$ and transistor $Q_2$.

Now, during the next time period $T_2$ to $T_4$, signal $e_h$ is relatively positive and the signal $e_i$ is relatively negative. Hence, signal $e_h$ turns ON each of transistors $Q_3$, $Q_6$, $Q_{11}$ and $Q_{14}$; whereas signal $e_i$ turns OFF transistors $Q_4$, $Q_5$, $Q_{12}$ and $Q_{13}$. Accordingly, the current $i_k$ which flows through lead K, now flows through transistor $Q_6$ and transistor $Q_2$. Thus, current $i_k$ from the period $T_2$ to $T_4$ exhibits a waveform that is similar to that of signal $e_a$. Similarly, current $i_o$ in lead O now flows through transistor $Q_{14}$ and transistor $Q_2$ as shown in FIG. 3E.

From the period $T_2$ to $T_4$, current $i_j$ in lead J now flows through transistor $Q_3$ and transistor $Q_1$ so as to exhibit a waveform that is similar to the waveform exhibited by signal $e_b$. Also, since transistor $Q_{11}$ is turned ON during the period $T_2$ to $T_4$, current $i_p$ flows in lead P and through transistor $Q_{11}$ and transistor $Q_1$ to exhibit the waveform illustrated in FIG. 3F.

It is appreciated that, as signals $e_h$ and $e_i$ alternate as shown in FIGS. 3C and 3D, currents $i_k$ and $i_j$ in leads K and J, respectively, as well as currents $i_o$ and $i_p$ in leads O and P, respectively, appear as illustrated in FIGS. 3E and 3F. The currents $i_o$ and $i_p$ are smoothed by integrating capacitor $C_1$ so that the output signal derived from output terminals O' and P' are proportional to the phase difference between the pilot signal applied to input terminals A and B and the reference signal applied to input terminals H and I. This output signal can be applied to voltage-controlled oscillator 3 (FIG. 1) to adjust the phase of the locally generated oscillating signal in the event that the phase of the signal applied to input terminals H and I differs from the phase of the signals applied to input terminals A and B. In the example illustrated in FIGS. 3A-3F, it has been assumed that the reference signal is in phase with the received pilot signal. However, in the event that a phase differential is present, a correcting, or control, signal will be provided at terminals O' and P' to adjust the phase of the locally generated oscillating signal produced by voltage-controlled oscillator 3. Thus, it is seen that differential amplifiers DA-1, DA-4 and DA-5 perform the same function as phase detector 2 illustrated in FIG. 1.

Turning now to the operation of the second double-balanced modulator, the signals applied to input terminals G and F are oppositely-phased 38 kHz reference signals produced by frequency divider 4, as shown by signals $e_j$ and $e_k$, respectively, in FIGS. 3G and 3H. When signal $e_j$ is relatively positive, transistors $Q_8$ and $Q_9$ are turned ON such that the currents flowing therethrough are determined by currents $i_j$ and $i_k$, respectively. When signal $e_k$ is relatively positive, transistors $Q_7$ and $Q_{10}$ are turned ON such that the currents flowing therethrough are determined by currents $i_j$ and $i_k$, respectively. Accordingly, during the period $T_o$ to $T_1$, the current $i_j$ flows through load resistor $R_2$, transistor $Q_8$ and lead J to produce a signal $e_L$ at output terminal L having a waveform similar to that of current $i_j$. During the next period ($T_1$ to $T_2$), signal $e_k$ turns transistor $Q_{10}$ ON such that the current $i_k$ flows through load resistor $R_2$, transistor $Q_{10}$ and lead K. Hence, signal $e_L$ at output terminal L exhibits a waveform that is similar to the waveform of current $i_k$ from time $T_1$ to time $T_2$. As signals $e_j$ and $e_k$ continue to oscillate, as shown in FIGS. 3G and 3H, output signal $e_L$ at output terminal L appears as shown in FIG. 3I.

The current through load resistor $R_1$ produces output signal $e_M$ at output terminal M. When signal $e_j$ is relatively positive to turn transistor $Q_9$ ON, current $i_k$ flows through load resistor $R_1$, transistor $Q_9$ and lead K to produce output signal $e_M$ during the period $T_o$ to $T_1$, as illustrated in FIG. 3J. It is seen that the waveform of this output signal during this period is similar to the waveform of current $i_k$. During the next period ($T_1$ to $T_2$) when signal $e_k$ is relatively positive, transistor $Q_7$ is turned ON such that the current through load resistor $R_1$ corresponds to current $i_j$ which flows through transistor $Q_7$ and lead J. Hence, the waveform of signal $e_M$ from time $T_1$ to time $T_2$ is similar to the waveform of current $i_j$, as shown in FIG. 3J.

Output signals $e_L$ and $e_M$ at output terminals L and M, respectively, are smoothed by integrating capacitor $C_2$ so that a resultant output signal level is produced which is proportional to the amplitude of the pilot signal applied to input terminals A and B. Since currents $i_j$ and $i_k$ are a function of the phase differential between the locally generated reference signal and the received pilot signal, these currents vary in the event of a phase difference therebetween, resulting in a lower level output across output terminals L and M. Consequently, since a spurious noise signal that may have a frequency component equal to that of the 19 kHz pilot signal generally will not be in phase with the locally generated reference signal, the presence of such a noise signal would, at best, result in a low level output across output terminals L and M. Therefore, the probability of energizing indicator lamp 10 (FIG. 1) in response to the presence of a spurious noise signal is minimized.

It may be appreciated that, in accordance with the balanced synchronous detector circuit of the present invention, only a single set of frequency dividers, such as frequency dividers 4 and 5 (FIG. 1) are needed to obtain phase detection and amplitude detection, whereas in prior art proposals, one set of frequency dividers is needed for phase detection and a separate set of frequency dividers is needed for amplitude detection. In addition, as seen in FIG. 2, only a single differential amplifier DA-1 need be provided to supply the received signal, for example, the received pilot signal, both to the phase detecting section and amplitude detecting section of the balanced synchronous detector circuit. Hence, the number of circuit components is reduced. Furthermore, since the differential amplifiers are connected as double-balanced differential amplifiers, the DC level at the output terminals is not varied significantly during operation, and components of the reference signals applied to input terminals F, G and H, I are not introduced into the output signals.

While the present invention has been particularly shown and described with reference to a preferred embodiment thereof, it should be readily apparent that various modifications and changes in form and details may be made without departing from the spirit and scope of this invention. Furthermore, although the balanced synchronous detector circuit is particularly useful with a stereo decoder, it need not be limited solely to this use. The amplitude and phase of a signal other than a stereo pilot signal can be detected by this circuit. Also, the signal provided by the balanced synchronous detector circuit which is proportional to the phase difference between the received signal and the generated signal, as applied to input terminals A, B and H, I, respectively, can be used for other purposes than merely for controlling a phase-locked loop. It is intended that the appended claims be interpreted as including the foregoing as well as various other modifications and changes in form and application.

What is claimed is:

1. A balanced synchronous detector circuit for detecting the amplitude of a received signal and for detecting the phase difference between said received signal and a generated signal, comprising:
a first double-balanced modulator having a first section provided with a first set of input terminals to which said received signal is applied and a second section provided with a second set of input terminals to which said generated signal is applied, said second section being provided with a set of output terminals;
a second double-balanced modulator having a first section formed of a portion of said second section of said first double-balanced modulator and a second section provided with a set of input terminals to which a signal whose frequency is an integral multiple of the frequency of said generated signal is applied, said second section of said second double-balanced modulator being provided with a set of output terminals;
means coupled to said set of output terminals of said first double-balanced modulator to provide a signal proportional to the phase difference between said received signal and said generated signal applied to said first and second sets of input terminals, respectively, of said first double-balanced modulator; and
means coupled to said set of output terminals of said second doubled-balanced modulator to provide a signal proportional to the amplitude of said received signal applied to said first set of input terminals of said first double-balanced modulator.

2. The balanced synchronous detector circuit of claim 1 further comprising a phase-locked circuit for generating said generated signal, including voltage-controlled oscillating means for generating an oscillating signal; frequency divider means receiving said oscillating signal for dividing the frequency thereof to produce said generated signal; and means for controlling the frequency of said voltage-controlled oscillating means as a function of said signal provided by said set of output terminals of said first double-balanced modulator.

3. The balanced synchronous detector circuit of claim 1 wherein said first section of said first double-balanced modulator comprises a first differential amplifier formed of a first pair of differentially-connected stages; and said second section of said first double-balanced modulator comprises second and third balanced differential amplifiers formed of second and third pairs of differentially-connected stages, respectively; said second differential amplifier being connected in series with one of said differentially-connected stages of said first differential amplifier and said third differential amplifier being connected in series with the other of said differentially-connected stages of said first differential amplifier.

4. The balanced synchronous detector circuit of claim 3 wherein one of said differentially-connected stages in said second differential amplifier has an output connected to an output of one of said differentially-connected stages in said third differential amplifier and the other of said differentially-connected stages in said second differential amplifier has an output connected to an output of the other of said differentially-connected stages in said third differential amplifier, said connected one and other stages forming said first section of said second double-balanced modulator.

5. The balanced synchronous detector of claim 4 wherein said second section of said second double-balanced modulator comprises fourth and fifth balanced differential amplifiers formed of fourth and fifth pairs of differentially-connected stages, respectively, said fourth differential amplifier being connected in series with said connected one stages of said second and third differential amplifiers and said fifth differential amplifier being connected in series with said connected other stages of said second and third differential amplifiers.

6. The balanced synchronous detector of claim 5 wherein one of said differentially-connected stages in said fourth differential amplifier has an output connected to an output of one of said differentially-connected stages in said fifth differential amplifier to form an output terminal of said second double-balanced modulator, and the other of said differentially-connected stages in said fourth differential amplifier has an output connected to an output of the other of said differentially-connected stages in said fifth differential amplifier to form another output terminal of said second double-balanced modulator.

7. The balanced synchronous detector of claim 4 wherein said second section of said first double-balanced modulator further comprises sixth and seventh balanced differential amplifiers connected in parallel with said second and third differential amplifiers, respectively, and formed of sixth and seventh pairs of differentially-connected stages, respectively.

8. The balanced synchronous detector of claim 7 wherein one of said differentially-connected stages in said sixth differential amplifier has an output connected to an output of one of said differentially-connected stages in said seventh differential amplifier to form an output terminal of said first double-balanced modulator, and the other of said differentially-connected stages in said sixth differential amplifier has an output connected to an output of the other of said differentially-connected stages in said seventh differential amplifier to form another output terminal of said first double-balanced modulator.

9. The balanced synchronous detector circuit of claim 1, wherein said first section of said first double-balanced modulator is a first differential amplifier composed of first and second transistors whose emitter electrodes are connected to each other and whose base electrodes are supplied with pilot signals which differ in phase from each other by 180°, and said second section of said first double-balanced modulator includes a second differential amplifier composed of third and fourth transistors whose emitter electrodes are connected to each other and are further connected to the collector electrode of said first transistor, and a third differential amplifier composed of fifth and sixth transistors whose emitter electrodes are connected to each other and are further connected to the collector electrode of said second transistor, the collector electrodes of said third and fifth transistors being connected to each other and the collector electrodes of said fourth and sixth transistors being connected to each other, the base electrodes of said third and sixth transistors and the base electrodes of said fourth and fifth transistors being supplied with generated signals which are of substantially the same frequency as the pilot signals and which differ in phase from each other by 180°; and wherein said second section of said second double-balanced modulator comprises a fourth differential amplifier composed of seventh and eighth transistors whose emitter electrodes are connected to each other and are further connected to the collector electrodes of said third and fifth transistors; and a fifth differential amplifer composed of ninth and tenth transistors whose emitter electrodes are connected to each other and are further connected to the collector electrodes of said fourth and sixth transistors, the base electrodes of said seventh and tenth transistors and the base electrodes of said eighth and ninth transistors being supplied with the signals of twice the pilot signal frequency which differ in phase from each other by 180°, the collector electrodes of said seventh and ninth transistors being connected to each other and being further connected to a first output terminal, and the collector electrodes of the eighth and tenth transistors being connected to each other and being further connected to a second output terminal.

10. The balanced synchronous detector circuit of claim 9, wherein said second section of said first double-balanced modulator further includes sixth and seventh differential amplifiers, said sixth differential amplifier being composed of eleventh and twelfth transistors whose emitter electrodes are connected to the collector electrode of said first transistor, the base electrode of said eleventh transistor being connected to the base electrode of said third transistor and the base electrode of said twelfth transistor being connected to the base electrode of said fourth transistor, respectively, said seventh differential amplifier being composed of thirteenth and fourteenth transistors whose emitter electrodes are connected to the collector electrode of said second transistor, the base electrode of said thirteenth transistor being connected to the base electrode of said fifth transistor and the base electrode of said fourteenth transistor being connected to the base electrode of said sixth transistor, respectively, the collector electrodes of said eleventh and thirteenth transistors being connected to each other and being further connected to a third output terminal and the collector electrodes of said twelfth and fourteenth transistors being connected to each other and being further connected to a fourth output terminal.

* * * * *